US005237207A

United States Patent [19]

Kwiatkowski et al.

[11] Patent Number: 5,237,207

[45] Date of Patent: Aug. 17, 1993

[54] MASTER ELECTRICAL LOAD CONTROL SYSTEM

[75] Inventors: Richard J. Kwiatkowski, Allentown; Michael J. Rowen, Center Valley, both of Pa.

[73] Assignee: Lutron Electronics Co., Inc., Coopersburg, Pa.

[21] Appl. No.: 872,859

[22] Filed: Apr. 23, 1992

Related U.S. Application Data

[63] Continuation of Ser. No. 346,975, May 3, 1989, Pat. No. 5,170,068, which is a continuation-in-part of Ser. No. 249,543, Sep. 26, 1988, Pat. No. 4,889,999.

[51] Int. Cl.$^5$ .................. H02J 3/00

[52] U.S. Cl. .................. 307/31; 307/38; 307/139; 307/141

[58] Field of Search .................. 307/11, 31–41, 307/112–117, 125, 129, 132 R, 132 E, 141, 141.4, 141.8, 139; 323/239, 272, 324, 905, 268–271; 315/64, 219, 314–319, 291–295, 320, 316, 299, 360, 361, 324, 315, 198, 199, 308; 362/85, 233, 239, 286, 293, 319, 386, 419; 361/189, 190; 340/310 R, 310 A

[56] References Cited

U.S. PATENT DOCUMENTS

| | | | |
|---|---|---|---|
| 3,796,890 | 3/1974 | Thompson et al. | 307/24 |
| 4,208,593 | 6/1980 | Sullivan | 307/35 |
| 4,216,384 | 8/1980 | Hurley | 307/39 |
| 4,388,567 | 6/1983 | Yamazaki et al. | 315/291 |
| 4,563,592 | 1/1986 | Yuhasz et al. | 307/115 |
| 4,570,216 | 2/1986 | Chan | 364/143 |
| 4,745,351 | 5/1988 | Rowen et al. | 323/239 |
| 4,755,792 | 7/1988 | Pezzolo et al. | 340/538 |
| 4,772,824 | 9/1988 | Gulledge | 315/291 |
| 4,889,999 | 12/1989 | Rowen | 307/31 |

OTHER PUBLICATIONS

Lutron Electronics Brochure-Grafik Eye® Preset Dimming Control-P/N 360-209-no date.

Enercon Data Corporation-Step Into The Future-no date.

X-10 Powerhouse-Product Catalog May 1988.

GE Lighting Controls-TLC System Overview-GEA-11868-no date.

Planning Your Touch-Plate Lighting Control System pp. 10–17, 20–21.

LiteTouch Lighting Control Systems.

Lightolier Controls.

*Primary Examiner*—Jeffrey A. Gaffin

*Attorney, Agent, or Firm*—Seidel, Gonda, Lavorgna & Monaco

[57] ABSTRACT

A system controls electrical power to multiple loads from both a central location and from local three-way controls. In one embodiment, the system includes means for sensing the power to each load. That sensing capability, in turn, permits the master to set all loads to the same power level, simultaneously, regardless of their original level. The local controls may be standard three-way dimmers or switches.

23 Claims, 6 Drawing Sheets

MASTER ELECTRICAL LOAD CONTROL SYSTEM

CROSS-REFERENCE TO PRIOR APPLICATION

This is a continuation of copending U.S. application Ser. No. 07/346,975 filed on May 3, 1989, now U.S. Pat. No. 5,170,068 which is a continuation-in-part copending U.S. application Ser. No. 249,543, filed Sep. 26, 1988 now U.S. Pat. No. 4,889,999.

BACKGROUND OF THE INVENTION

This invention relates to a system for controlling power to multiple AC lighting loads from both local controls and a central location.

2. Description of the Related Art

Systems are known for controlling lighting loads from both a master control and from local controls that are near the loads.

Remote control master switching systems are available from General Electric. These systems include master selector switches to provide individual local control or master control. A similar system is available from Touch-Plate International, Inc., of Emeryville, Calif.

Centrally-controlled dimming systems are available from LiteTouch, Inc. and from Electro Controls Inc., both of Salt Lake City, Utah.

The Touch-Plate, LiteTouch, and Electro Controls master control systems all use a remote power control panel that contains triacs and relays to control (i.e., to dim or switch) the power to the load. The controls for the system include a centrally located master station and, dispersed throughout a building, buttons to turn the lights on and off or to provide "raise/lower" dimming of the light. Raise/lower dimming is accomplished by pushing a button to raise or lower the power to the lighting load. When the desired level is reached, the button is released.

Another system for central dimming of lighting is available from Lightolier Controls, Secaucus, N.J. That system involves multiple local ("Easyset") controls that can provide raise/lower dimming. Multiple Easyset dimmers can be operated through a single master; however, they must all be on the same circuit, which, in accordance with the National Electrical Code, limits total power to 2000 W.

The Grafik Eye® dimming control, manufactured by Lutron Electronics, Coopersburg, Pa., allows a number of lighting loads to be controlled from a central location. The power delivered to each load can be set by adjusting a corresponding actuator, or by selecting among four preset "lighting scenes", each scene corresponding to specific power levels delivered to each load. The system also includes auxiliary scene-select controls, which can be located throughout an area, to enable a user to select lighting scenes from additional locations.

Lutron also provides central dimming and switching control of multiple zones of lighting with Versaplex® and Aurora® dimming systems. These systems do not include wallbox dimmers dispersed to the spaces in which lighting is being controlled, instead requiring centralized power cabinets.

A system available from Enercon Data Corp, of Minneapolis, Minn., uses power relays, which can be mounted in junction boxes, throughout a building and can be locally or centrally switched. In order to dim an area with this system, a standard dimmer may be located near the load; however, the enabling switch that turns power to the dimmer on and off must be separated from the dimmer by a physical barrier (for reasons discussed below). As a result, separate dimmers and switches are required, increasing the number of controls on the wall and complicating the wiring.

Another system, available from X-10 (USA) Inc., of Northvale, N.J., allows master control of a number of local controls wired throughout a house or other building. The X-10® Powerhouse™ system uses the existing powerline carrier to send control signals to each of the local controls. The local controls interpret the signals and switch a power relay or adjust the power output of a dimmer accordingly. The system may independently control up to eight local controls and has the added capability to turn all the local controls on or off simultaneously.

A wallbox dimmer with plural remote control switches is disclosed in U.S. Pat. No. 4,563,592, issued Jan. 7, 1986, to Yuhasz et al, incorporated herein by reference. The system allows dimming of a lighting load from a central location, and toggle on/off control from a plurality of remote locations. Additionally, the system discloses a master control system, whereby a number of dimming controls can be simultaneously toggled from a master toggle switch.

It is well known in the art to use manually operable multi-pole power switches (e.g., three-way and four-way toggle switches) to turn a lighting load on or off from a plurality of locations. Such a system typically includes two three-way switches, connected in series between incoming hot and the lighting load, and any number of four-way switches wired between the two three-way switches. Toggling any one of the switches causes the light output to change states, (i.e. to change from on to off or vice versa). One drawback of these systems is that toggling a switch to a certain position does not consistently correspond to the same status of the lights, either on or off. This can be a problem if, for instance, the light cannot be seen from the switch location (as is often the case with outdoor lighting that is controlled from within a house), because the user does not know if he is turning the lights on or off. The present invention provides electrically-operable three-way switches, which are better adapted for remote or light-touch operation and which permit greater design flexibility to meet aesthetic requirements.

SUMMARY OF THE INVENTION

In one embodiment of the present invention, a system to control electrical power from a source, through a plurality of three-way controls, to corresponding loads, comprises, in combination:

(a) electrically-operable three-way switch means for connecting and disconnecting said source through said three-way controls to said corresponding loads, and (b) master control means to provide a signal to said switch means to determine the power provided to said load, whereby power to each of said loads is selectively controlled by said master control means or said corresponding three-way controls.

In another embodiment of the present invention, a system to control electrical power from a source, through a plurality of three-way controls, to corresponding loads, comprises, in combination:

(a) electrically-operable three-way switch means for connecting and disconnecting said source through said three-way controls to said corresponding loads, and (b) a plurality of master control means, each to provide a signal to said switch means to determine the power provided to each of said loads, whereby power to each of said loads is selectably controlled by said plurality of master control means or said corresponding three-way controls.

In another embodiment of the present invention, a system to control electrical power from a source, through a plurality of three-way controls, to corresponding loads, comprises, in combination:

(a) electrically-operable three-way switch means for connecting and disconnecting said source through said three-way controls to said corresponding loads, (b) master control means to provide a signal to said switch means to determine the power provided to each of said loads, and (c) means for sensing the power provided to each of said loads, whereby power to each of said loads is selectably controlled by said master control means or said corresponding three-way controls.

In another embodiment of the present invention, a system to control electrical power from a source, through a plurality of power controls, to corresponding loads, comprises, in combination:

(a) electrically-operable toggle switch means for alternately connecting and disconnecting said source through said power controls to said corresponding loads, and (b) master control means to provide a signal corresponding to a desired power provided to each of said loads, (c) means for sensing the actual power provided to each of said loads, (d) means for comparing said desired power and said actual power for each of said loads and for actuating said corresponding switch means if said powers are not substantially equal, whereby power to each of said loads is selectably controlled by said master control means or said corresponding power controls.

The system of the present invention allows a number of lighting loads to be controlled from a central master control, while permitting the loads to be dimmed from individual local controls that are near the loads. The local controls may include an enabling means, such as a switch, which takes command from the master control and enables the dimmer to control power to the load. An advantage of the present system over prior art systems is that the individual controls can be wallbox dimmers. These dimmers combine a power circuit, an enabling switch, and dimming control in a single unit, thus simplifying their installation and replacement. In a preferred embodiment, the on/off status of the lighting loads can be displayed at the master control and/or at the individual controls.

In another embodiment, the system provides master control of a number of three-way controls, which are preferably standard three-way switches or three-way dimmers. In this specification and appended claims, "three-way controls" are understood to be wiring devices which have at least two power input or two power output lines and a switching device—mechanical or otherwise—for electrically connecting an input line with an output line. Power to each of a plurality of loads can be turned either on or off from a master control or from a local three-way control. The master control may control each lighting load independently, or control a group of lighting loads simultaneously (e.g., turn all lights either on or off).

DETAILED DESCRIPTION OF THE INVENTION

As used in the present specification and appended claims, a lighting load consists of one or more lamps that are switched and/or dimmed in unison. In many lighting control applications, it is desirable to turn a number of lighting loads on and off from a centralized master control. In these situations, it is often desirable, as well, to control lighting levels independently at individual controls near the load locations.

Figure 1:
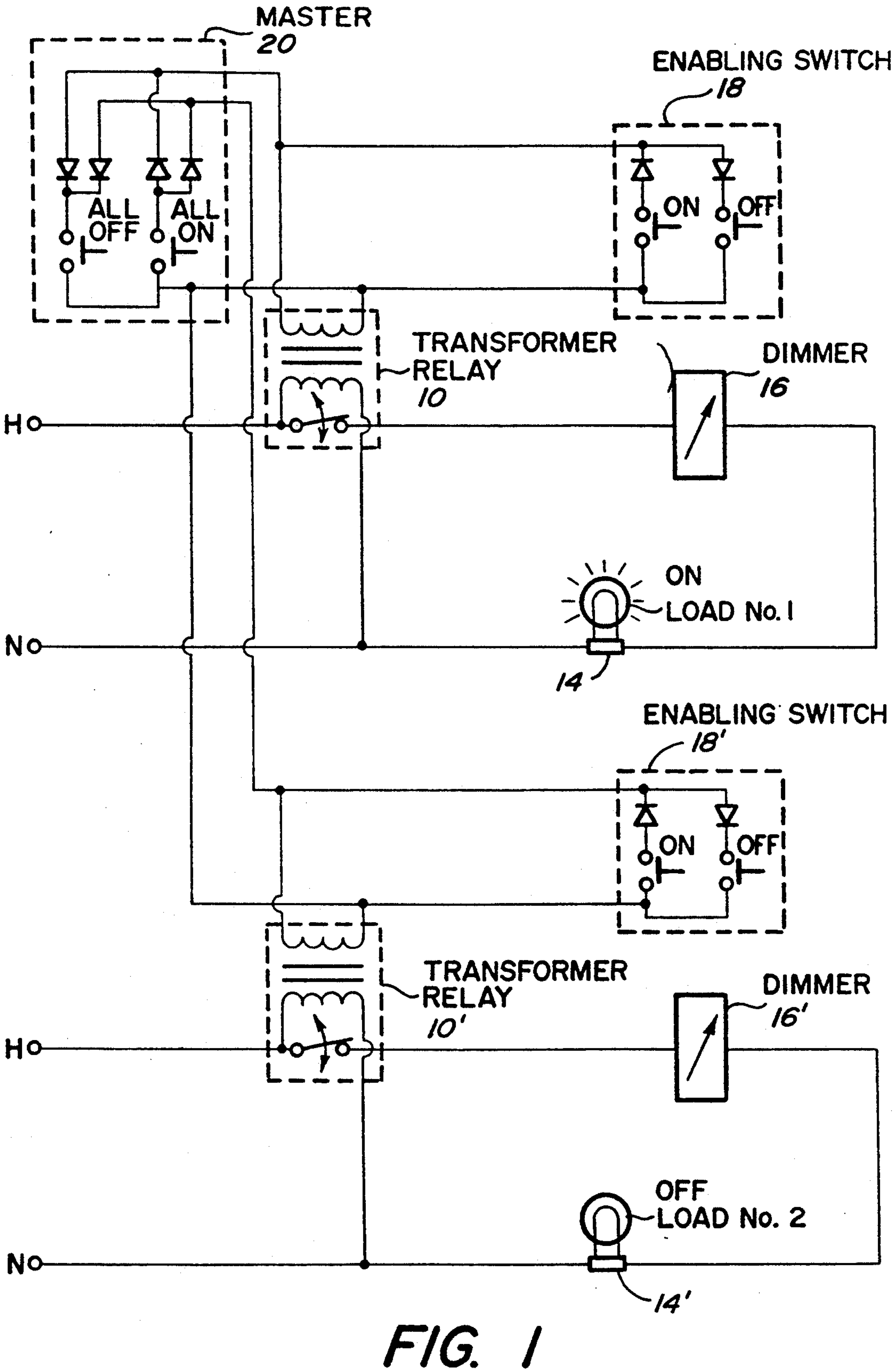
FIG. 1 (PRIOR ART)
FIG. 1 depicts a prior art load control system.

FIG. 1 is a schematic that shows how this dual-control method is accomplished in a prior art system (such as the Enercon Data Remote Control Signaling System (RCSS). Line voltage—120 V in the U.S.—is carried to transformer relays in junction boxes. The relays, such as relays 10 and 10', are latching relays and may latch either open or closed, depending on the direction of current flow through the secondary. The relays control the application of power to lighting loads, such as 14 and 14', and may be dispersed throughout a building. The level of power provided to loads 14 and 14' may be controlled by local dimmers 16 and 16', respectively. Note that these circuits are "branch" circuits; i.e., they carry line voltage. Switching of the power is accomplished by local enabling switches, such as 18 and 18', and by master control switch 20, which turns the entire system on and off. As shown, the system includes two relays that are commonly mastered; however, additional relays may be included. A limitation of this system is that no power is supplied to dimmer 16 if relay 10 is in the "off" mode. Before dimmer 16 can be operated, local enabling switch 18 must first switch relay 10 to the "on" position. Because of this limitation, any load 14 that is to be locally dimmed must have a local enabling switch mounted nearby.

Because master switch 20 and the enabling switches do not directly control power to a load, the wiring to enabling switches 18 and 18' and to master switch 20 may be "Class 2" (as defined in the National Electrical Code). Class 2 circuits generally carry lower voltages and have certain power limitations—power is either inherently limited, thus requiring no overcurrent protection, or is limited by a combination of a power source and overcurrent protection. Dimmer 16 and switch 18 may both be located in the same area; however, since the dimmer is supplied by a branch circuit and the switch by a Class 2 circuit, the National Electrical Code requires that the circuits be separated by a physical barrier. The system of the present invention eliminates the need for this physical barrier between the local dimmer and enabling switch and permits the dimmer and switch to be in a proximate relationship in a single wallbox, as described below. The present invention also simplifies wiring and permits one wall control device to perform both dimming and switching, combining the functions of the enabling switch and the local dimmer. The level of power to each load can be adjusted by its corresponding dimmer, regardless of the state of any other switches—master or otherwise—in the circuit.

Figure 2:
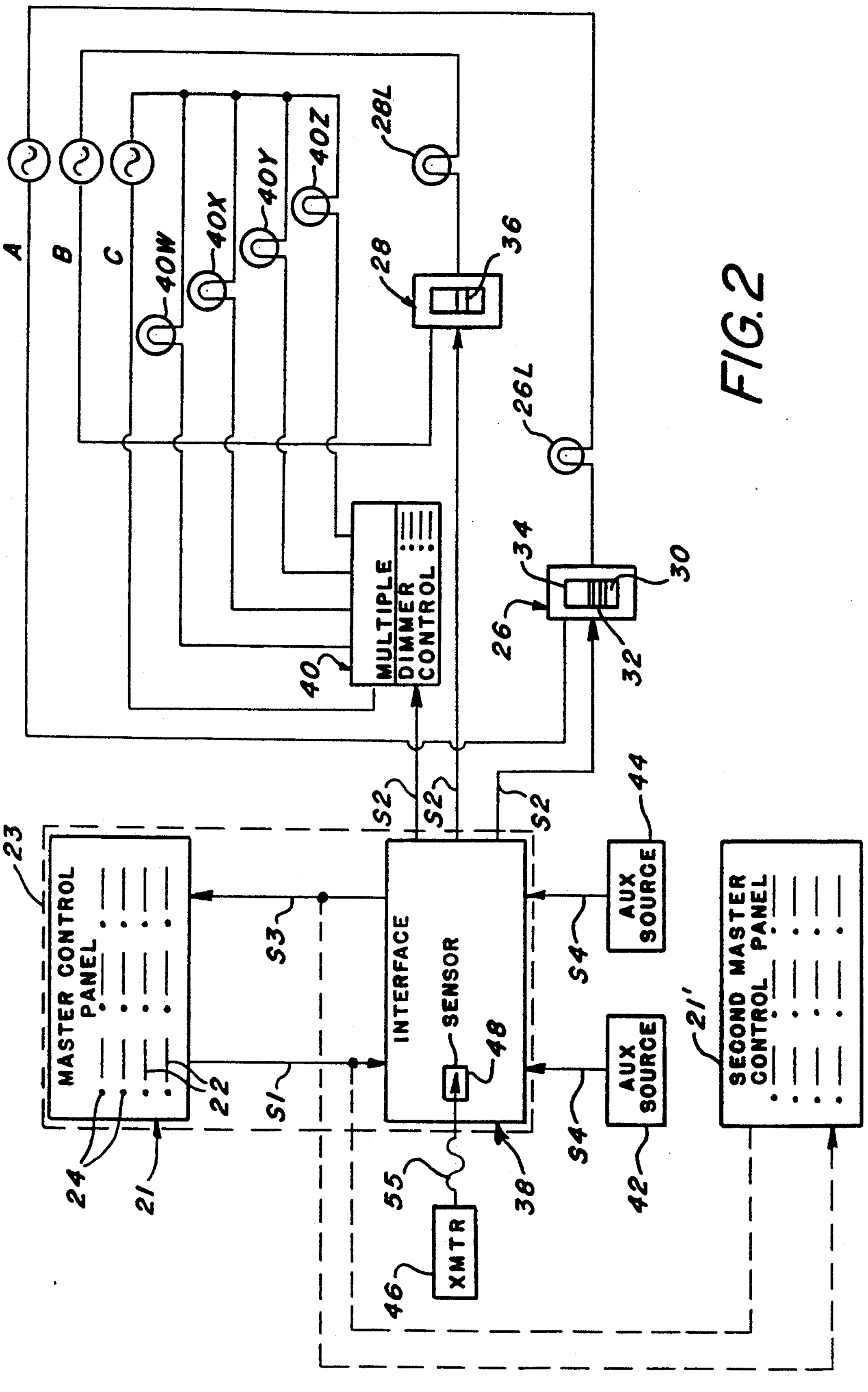
FIG. 2 is a block diagram of an embodiment of the present invention.

FIG. 2 depicts an embodiment of the present invention. A master control panel 21 includes push-button switches 22 to control a number of dispersed lighting loads. Optionally, each switch has a corresponding indicator 24 that shows whether power to that load circuit is on or off. The indicators can be any of a number of devices, well known in the art, that show system status, such as pilot lights, analog indicators, liquid crystal displays, etc. A preferred way of indicating system status comprises LED lamps that are bright when power to the controlled circuit is on and either dim or off—whichever is preferred—when power to the controlled circuit is off. Indicators 24 in FIG. 2 are LEDs.

Wallbox dimmers 26 and 28 control lighting loads 26L and 28L, respectively. For illustrative purposes these loads are symbolically depicted as being incandescent lamps, however, they can as well be gas discharge lamps, low voltage incandescent lamps, inductive motors, or any other type of lamp or load well known in the art.

Figure 3:
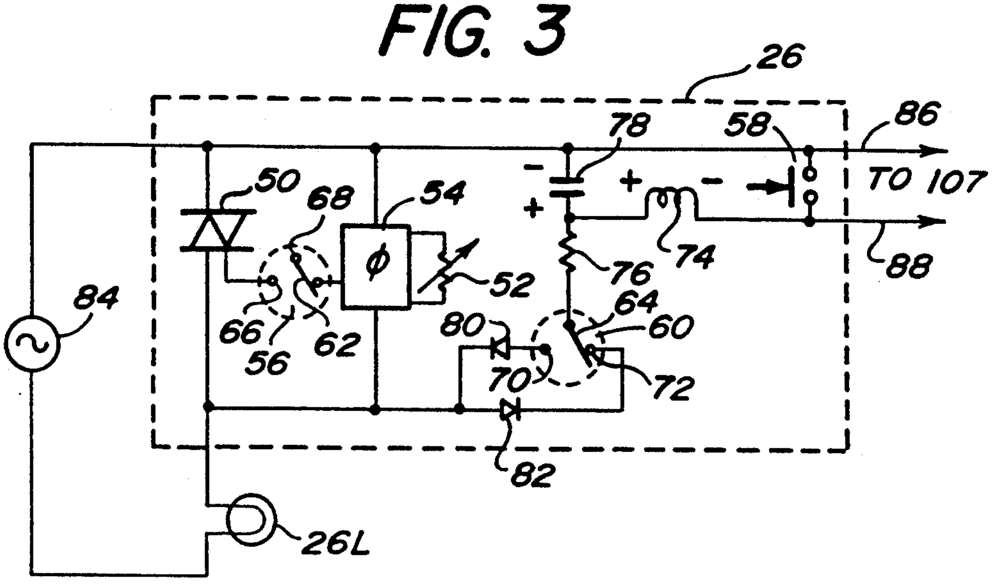
FIG. 3 is a schematic of a dimmer component of the present invention.

Dimmer 26 houses a conventional dimming circuit and an enabling means. Optionally, dimmer 26 includes an actuator slider 30 and an enabling push-button 32, contained in slider 30, which operates to enable the power control function of dimmer 26. Once dimmer 26 is enabled by push-button 32, the position of slider 30 instantaneously determines the power provided through the dimming circuit to load 26L; i.e., the amount of power is determined by the slider setting. If a different power level is desired, the slider can again be moved to adjust the power. Alternatively, the slider can be moved to a desired setting while power to the load remains off. Depressing the push-button then gives the desired power level. In another embodiment, there can be more than one dimmer controlling a lighting load. In that case, the push-button is depressed to take control of the power to the load at that dimmer. As before, depressing the push-button provides to the load a value of power that is determined by the slider setting. Optional indicator lamp 34 lights when power to the load is on and is either dim or off, whichever is preferred, when power to the load is off. A schematic of the circuitry of dimmer 26 is shown in FIG. 3 and is discussed later. Dimmer 28 can be a different type of dimmer, in which moving slider 36 automatically enables dimmer 28 to control power to load 28L. Thus, moving slider 36 to the desired setting will instantaneously provide the desired power level, whether or not dimmer 28 is initially in control of the power. A mechanism for accomplishing this function is disclosed in U.S. Pat. No. 4,689,547, issued Aug. 25, 1987, to M. Rowen et al.

Independent dimmer controls 26 and 28 communicate with master control 21 through interface 38. Interface 38 isolates input signals S1, which come from master control 21, from line-power-level output signals S2, which go to the local controls. Preferably, the signals between master control 21 and interface 38, including optional system status signals S3, are low voltage signals and are carried by Class 2 circuits, defined earlier.

Mater control 21 and interface 38 may be housed separately, as shown in FIG. 2, or, if desired, may be combined within a single housing 23 indicated in phantom. Output from interface 38 may optionally power multiple-dimmer systems (i.e., multiple dimmers in a single enclosure). For example, multiple-dimmer control 40 controls power to a number of lighting loads, 40W, 40X, 40Y, 40Z, each of which can be adjusted independently. Note that separate power lines A, B, and C provide power to controls 26, 28, and 40, respectively, even though these controls are all commonly "mastered" (by master control 21). If these controls power lighting loads, the National Electrical Code limits these circuits to a maximum of 16A (~2000 W maximum power) each. However, additional circuits could be present, all controlled by master control 21. The National Electrical Code also prohibits circuits that permit current flow from the load side of one circuit protector (e.g. breaker) to the load side of another circuit protector. Thus, when more than 2000 W is to be controlled, more than one circuit is required. Some prior art systems that are commonly mastered (such as the Lightolier Easyset) do not include isolation between the mastering and power functions, which is provided by interface 38 in the present invention. Thus, all commonly-mastered loads are supplied from a single power line, and all lighting loads are limited to a combined total of about 2000W. Although the description of the control system of this invention has focused on lighting loads, the loads controlled by the system may also include non-lighting load, such as fans, motors, etc.

Besides serving to isolate the low voltage signals of the master control from the line voltage signals to the dimmers and other controls, interface 38 can optionally accept inputs S4 from auxiliary sources, schematically depicted as 42 and 44. These sources may include time-clocks, occupancy sensors, security systems, and other devices, related to lighting control or unrelated. These inputs may be switch closures or electrical inputs. The inputs may also be radiated inputs, such as infrared or radio frequency signals (exemplified by S5 from transmitter 46, that are detected by sensor 48 on the interface. These auxiliary sources can, in turn, interact with the master control and, indirectly, with the independent dimmers; thus, these auxiliary sources can control and/or be controlled by the other devices that are connected to the master control.

FIG. 3 is a schematic of an embodiment of wallbox dimmer 26. Controllably conductive device 50 (depicted as a triac) provides to a load power that is determined by a phase angle set by potentiometer 52 of phase control circuit 54. Relay contacts 56 and 60 are part of a double pole, double throw latching relay. Movable poles 62 and 64 of relay contacts 56 and 60, respectively, move in tandem when relay coil 74 is pulsed. When enabling switch 58 is depressed, capacitor 78 discharges through relay coil 74 and switch 58. Thus, relay coil 74 is energized in the polarity shown, moving pole 64 or relay contacts 60 to position 70. Simultaneously, pole 62 of relay contacts 56 moves to position 66. This configuration constitutes a dimmer "on" condition, since triac 50 is periodically gated on by phase control circuit 54 through the switch closure provided by contacts 56. Note that capacitor 78 will now charge in a polarity opposite to that shown, through resistor 76 and diode 80. The power to charge capacitor 78 is derived from AC power source 84 through load 26L when triac 50 is in its non-conducting state. (Typically, in a phase control dimming circuit, the triac has a brief non-conducting period at the beginning of each half cycle, even when the dimmer is set at full power.) When switch 58 is depressed again, capacitor 78 discharges through relay coil 74, causing poles 64 and 62 to move to positions 72 and 68, respectively. Trias 50 is now disconnected from phase control circuit 54, and the dimmer is in an "off" state. Simultaneously, diode 82 is switched in series with resistor 76 and capacitor 78, which charges capacitor 78 in the polarity shown. Thus, consecutive closures of switch 58 alternatively switches dimmer 26 on and off. Lines 86 and 88 connect dimmer 26 to interface 38.

Figure 4:
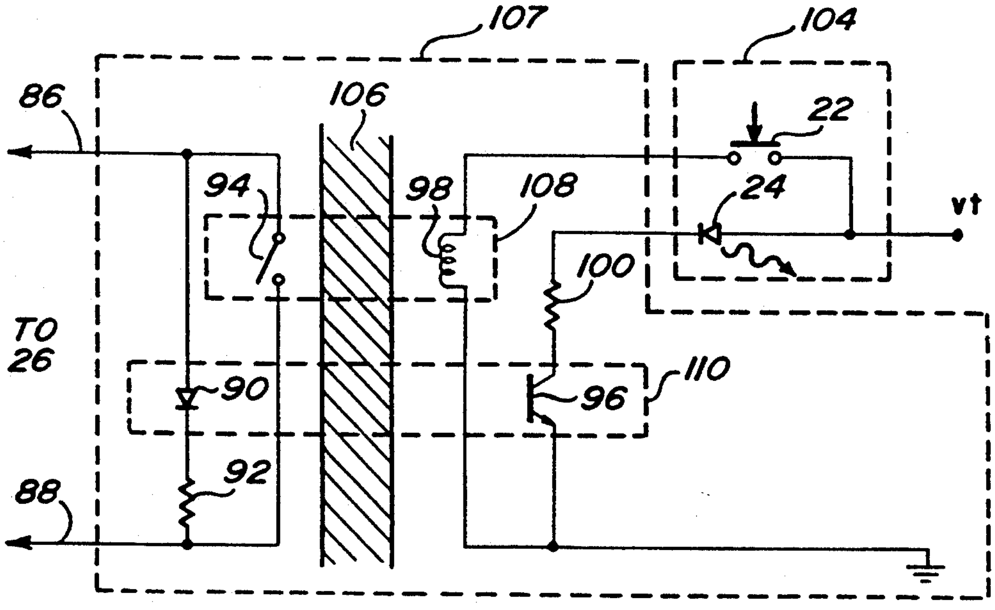
FIG. 4 is a schematic of elements of an interface and master control of this invention.

FIG. 4 depicts an embodiment of circuits that perform the functions of master control 21 and interface 38. 107 is the circuit associated with each input/output pair of interface 38. 104 is the circuit associated with each input/output pair of master control 21. D.C. voltage (V+) is applied across LED 24 and relay 108. Switch 22, when closed momentarily, energizes relay coil 98, which closes switch 94 (which is a relay contact) for as long as switch 22 is held closed. This closure of switch 94 discharges capacitor 78 in dimmer 26 (see FIG. 3) through relay coil 74, toggling dimmer 26 on or off. Note that switches 94 and 58 (in dimmer 26) have similar effects.

When dimmer 26 is in the "on" state, capacitor 78 is charged opposite to the polarity shown, line 86 is positive with respect to line 88 and current flows through LED 90 and resistor 92. Light emitted by LED 90 causes phototransistor 96 to conduct current through LED 24 and resistor 100.

When dimmer 26 is off, line 88 is positive with respect to line 86, LED 90 emits no light, and transistor 96 permits no current to flow through LED 24. LED 24 thus works as a pilot light for dimmer 26, and switch 22 acts as an on/off switch for dimmer 26.

Isolation region 106, shown in crosshatch, is bridged by relay 108 and optocoupler 110. These devices are selected to meet the requirements of the National Electrical Code for 2500 V of isolating between inputs and outputs. Relay model #G6B-114P-US-12V, manufactured by Omron Corporation of Japan, and optocoupler model #4N25, manufactured by General Electric, are typical of devices that meet this requirement. Although relay 108 and optocoupler 110 work equally well at transmitting on/off signals through isolation region 106, optocoupler 110 has some advantages when more complex signals are transmitted. Since an optocoupled transistor is a linear device when operated in its active region, analog signals (such as intensity levels) can be transmitted from input to output through the isolation region. Transistors are also inherently much faster than relays; thus, much higher data rates are possible.

Figure 5:
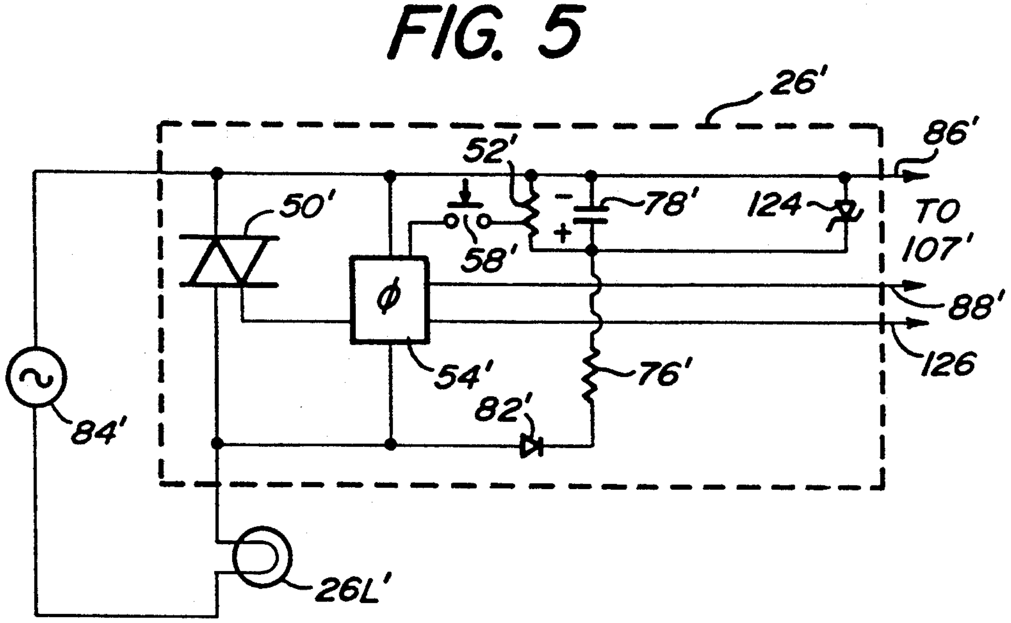
FIG. 5 is a schematic of elements of an alternative embodiment to FIG. 3.

FIG. 5 shows a variation of dimmer 26 that can communicate with a master control means via analog signals. Source 84', triac 50', load 26L', diode 82', resistor 76', potentiometer 52', and capacitor 78' are substantially similar to the correspondingly numbered elements of FIG. 3. Phase control circuit 54' is designed to accept a variable DC voltage as an input to set the firing angle of triac 50'. This is accomplished with any commonly available phase control integrated circuit, such as the U208B manufactured by Telefunken, Inc. Switch 58' is in series with the wiper of potentiometer 52', so that closing switch 58' transmits to phase control circuit 54' the voltage present on the wiper of potentiometer 52'. Line 126 provides an alternative input to 54' that allows master control 21 to control the firing angle of triac 50'. Circuit 54' supplies a variable DC voltage between lines 86' and 88' which is proportional to the voltage supplied to load 26L'. Zener diode 124 regulates the voltage across capacitor 78' and potentiometer 52'. Regulation is desirable here, since 54' is a voltage controlled circuit.

Figure 6:
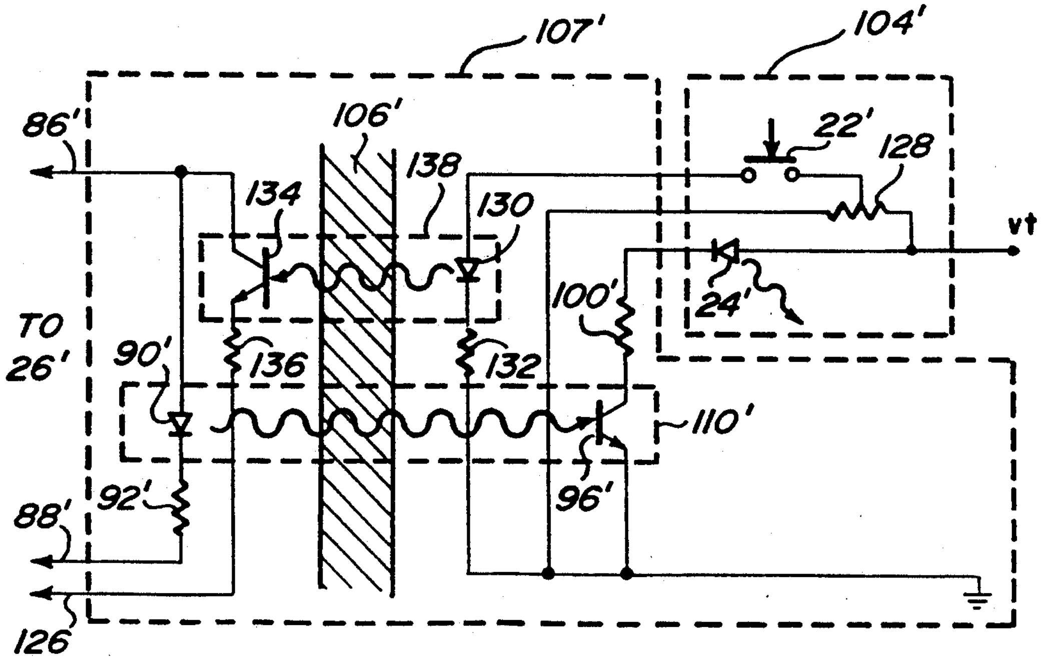
FIG. 6 is a schematic of elements of an alternative embodiment to FIG. 4.

FIG. 6 shows the interface and master control schematics that are associated with dimmer 26' of FIG. 5. LED 24', switch 22', optocoupler 110', resistor 92', resistor 100', and isolation 106' are substantially similar to the correspondingly numbered elements of FIG. 4. Between lines 86' and 88' is a variable DC voltage that is controlled by dimmer 26' and is proportional to the voltage supplied to load 26L'. This variable DC voltage varies the current flowing through LED 90' and, therefore, through transistor 96' and LED 24'. Thus, the brightness of LED 24' on master control 21 will vary in proportion to the brightness of load 26L'. Alternatively, LED 24' could be a linear array or LEDs that successively light as the power to load 26L' is increased. Master switch 22' is connected in series with the wiper of potentiometer 128, resistor 132 and LED 130 of optocoupler 138. The current through LED 130 is thus determined by the wiper position of potentiometer 128, when switch 22' is closed. Thus, a variable DC current, determined by the wiper position of potentiometer 128 flows through transistor 134 and line 126 into circuit 54' (FIG. 5) to control the firing angle of triac 50'.

As shown in FIG. 6, LED 90', resistors 92' and 136, and phototransistor 134 are in electrical contact with lines 86', 88', and 126, which are in contact with various circuit components of dimmer 26' (see FIG. 5). Since they are in electrical connection, there circuit components could be designed to exist inside of dimmer 26'. Similarly, LED 130, resistors 132 and 100', and phototransistor 96' could be designed to exist inside a master control, since they are in electrical connection with circuit 101' of a master control. The only system component that would remain would be isolation 106'. This isolation could be accomplished by using fiber optic cable to connect phototransistor 134 and LED 90' (now of dimmer 26') to LED 130 and photo transistor 96', respectively (now of a master control). Fiber optic cables are electrically non-conductive and therefore meet National Electrical Code requirements for isolation. The communication between dimmer 26' and a master control would thus be in the form of light signals transmitted through fiber optic cables.

Figure 7:
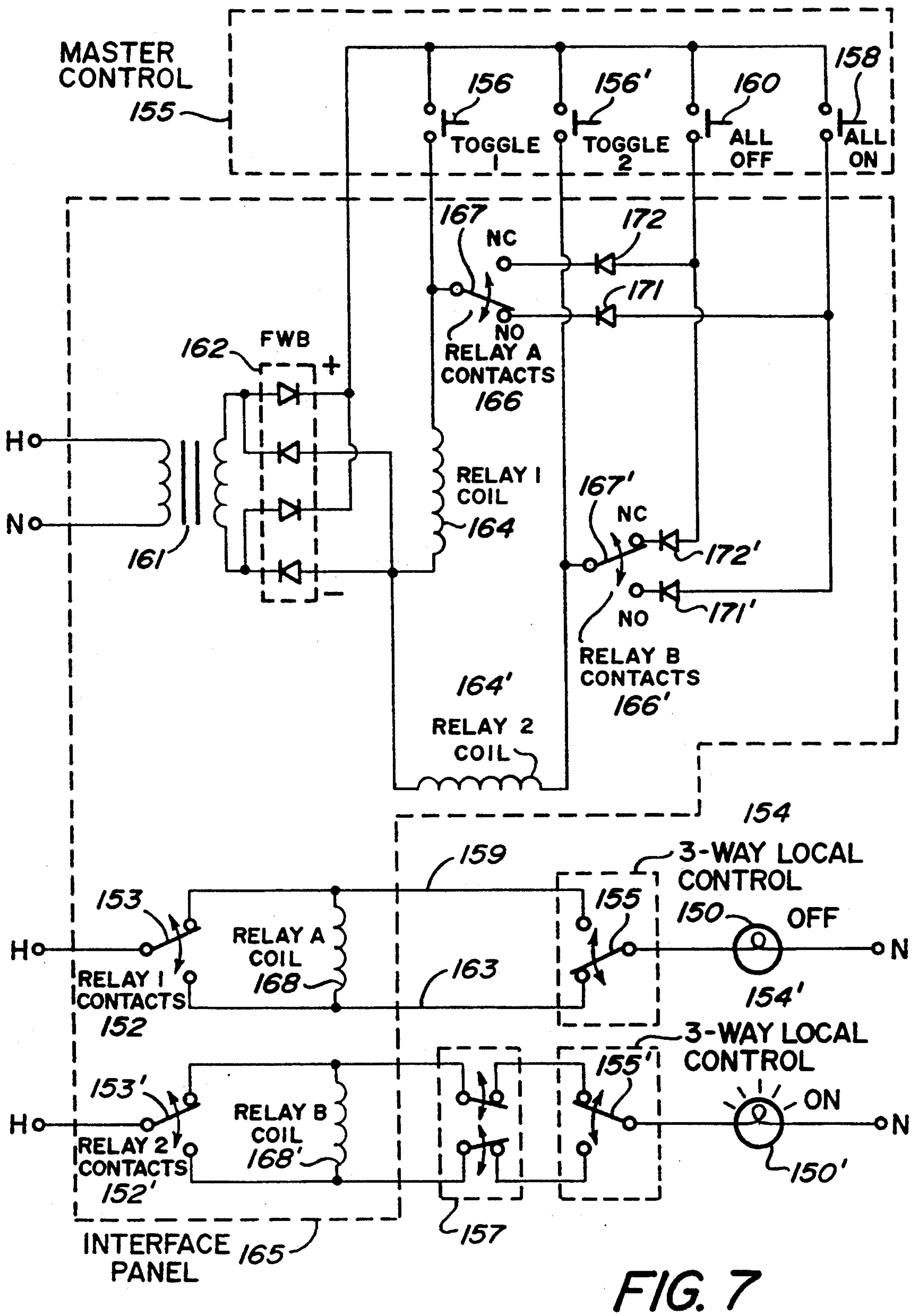
FIG. 7 is a simplified schematic of an alternative master control system of the present invention.

FIG. 7 shows another embodiment of the present invention for master control of standard three-way controls, such as three-way switches and three-way dimmers. Power to loads 150 and 150' (and additional loads, not shown) can be turned either on or off from master control 155 or from local three-way controls 154 and 154'. Preferably, master control 155 can control each lighting load independently or control a group of lighting loads simultaneously (e.g. turn all lights either on or off). Master control 155 may further include a dimming circuit for controlling the level of power delivered to each load. The dimming circuit may be of any type well known in the art, such as that shown in FIG. 6 of U.S. Pat. No. 4,563,592, issued Jan. 7, 1986, referred to earlier. Additionally, the present invention allows for any number of four-way switches to be added to the three-way circuit in a standard "n-way wiring scheme" (four-way switches electrically connected in series between three-way switches). For example, power to load 150' can be turned on or off from any one of a number of local controls 154' and 157 or from master control 155.

Local controls 154 and 154' are preferably standard three-way or four-way switches (such as standard wall mounted toggle switches), or three-way dimmers; however, any wiring device having three-way or four-way switching capability may be used. A standard three-way dimmer is essentially identical to a single location dimmer except that the three-way dimmer includes a three-way switch for switching between power lines (such as power supply lines 159 and 163). Alternatively, a single location dimmer can be used in conjunction with three-way or four-way switches. The dimmer may be a rotary type or, preferably, a linear slide type, in which power to the load corresponds to the position of a dimming adjustment actuator. It may have a separate button or knob for actuating the three-way switch, or the button may be integral with the dimming adjustment actuator. Alternatively, the dimming adjustment actuator may operate the three-way switch at a predetermined position, such as full-on or full-off. A local control may also constitute a "multi-zone" (multiple load) dimmer that permits power to a plurality of lighting loads to be adjusted by selecting among a variety of preset lighting levels.

Additional master controls can be used to control lighting loads throughout a building. One such master control panel 21' is shown generally in FIG. 2, interconnected to signals S1 and S3. Typical locations for master controls in a residental application may include, for example, the master bedroom, the entrance hall, and the living room. The master control may be wallbox-mountable or it may be portable and remote, such as a wireless remote transmitter, for instance (described in copending U.S. application Ser. No. 079,847, filed Jul. 30, 1987, which was continued as U.S. Ser. No. 07/430,922 filed Nov. 1, 1989, incorporated herein by reference). Master control 155 preferably has a number of push-buttons, each corresponding to a particular lighting load, and additional buttons capable of simultaneously turning a preselected group of lights on or off. Optionally, each button has an indicator that shows whether power to the corresponding lighting load is on or off. The indicators can be any of a number of devices, well known in the art, that show system status, such as pilot lights, analog indicators, liquid crystal displays, etc. A preferred way of indicating load status is an array of LED lamps that are bright when power to the corresponding load is on and either dim or off—whichever is preferred—when power to the load is off.

Optionally, master control 155 may include a "lock-off" function that enables a user to disable the local controls, thus preventing the lights from being changed at a local control. This can be useful if, for instance, local controls 154 and 154' are in a public space (such as a school or a library), because it prevents unauthorized users from turning the lights on or off. Momentary switches 158 and 160 (discussed below) would perform the lock-out function if they were maintained, rather than momentary switches.

Power to load 150 is determined by the positions of pole 153 of relay 1 and pole 155 of local three-way control 154 (Similarly with load 150' and poles 153' and 155'). Relays 1 and 2 are latching-toggle relays (commonly called alternative-action impulse relays). A latching-toggle relay is a particular type of electrically-operable switch, suitable for the present invention. Such a relay generally has contacts (e.g., 152) that are controlled by a magnetizing coil (e.g. 164). Energizing the coil causes the pole to switch positions. Preferably, contacts 152 and 152' are changeover contacts (as illustrated) to enable three-way switching between two opposite contacts. Thus relay 1 comprising coil 164 and changeover contacts 152, and relay 2 comprising coil 164' and changeover contacts 152' are each three-way relays. Alternatively, any controllably conductive device or switching circuit that can switch between power lines can be used, including thyristors, diode networks, and optically coupled transistors.

For convenience, relays 1 and 2, and the accompanying control circuit are contained in interface panel 165, which can be mounted in an electrical closet or basement. Alternatively, the relays and the accompanying control circuit may be integrated into master control 155. For illustrative purposes. Local controls 154 and 154' are shown as simple three-way switches; however, they may alternatively comprise a plurality of three-way and four-way switches, or a three-way dimmer, or any other wiring device having three-way or four-way switching capability. With contacts positioned as shown, the power provided to load 150 is essentially zero, because pole 153 of relay 1 and pole 155 of control 154 are on opposite contacts. Power to load 150' is on because the respective poles of relay 2 and control 154' are on the same contact.

Master control 155 sends control signals corresponding to desired load states to interface panel 165, which controls the power provided to loads 150 and 150'. Control signals are preferably momentary switch closures; however, signals such as electrical pulses, infrared, radio frequency, or ultra-sound may also be used. Signals may also be digitally encoded, multiplexed, amplitude modulated, or encoded by any other suitable encoding scheme. Actuating momentary contacts 156 and 156' alternately turns power to loads 150 and 150' on and off, respectively. Actuating momentary contacts 158 and 160 simultaneously turns all loads on and off, respectively. Optionally, master control 155 may include a dimming circuit for controlling the level of power provided to each load.

Interface panel 165 is supplied by low voltage DC from transformer 161 and full-wave bridge 162 and is electrically isolated from the line voltage applied across loads 150 and 150'. The circuit operates as follows: Latching-toggle relay 1 is toggled (pole 153 is switched and latched to the opposite contact) when DC current flows through corresponding relay 1 coil 164. Similarly, current through relay 2 coil 164' causes relay 2 to toggle. The direction of current flow through the coil does not affect the operation of the toggle relay, as the pole alternately switches from one contact to the other whenever the coil is energized. To turn load 150 on, for example, momentary contact 156 is actuated, allowing DC current from full-wave-bridge 162 to flow through relay 1 coil 164, thus toggling relay 1 pole 153 to the opposite contact. Power will then flow to load 150, because the respective poles 153 and 155 are on the same contact. In order to turn load 150 off again, momentary contact 156 is again actuated. Current flows through relay coil 164, switching pole 153 back to its original position, thus blocking power to load 150. Thus, actuating momentary contact 156 toggles relay 1 and alternatively turns corresponding load 150 on and off. Similarly, load 150' can be alternately turned on and off by actuating momentary contact 156'.

Preferably, loads 150 and 150' (and additional loads not shown) can also be turned on or off simultaneously by actuating momentary contact 158 or 160, respectively. Actuating "all-on" momentary contact 158 sends a control signal to interface panel 165 instructing it to turn loads 150 and 150' on. To accomplish this, pole 153 must switch contacts to apply power to load 150, and pole 153' must not switch contacts since load 150' is already on. Similarly, actuating "all-off" momentary contact 160 sends a control signal to interface panel 165 instructing it to turn loads 150 and 150' off. Pole 153 must not switch contacts, since the corresponding load 150 is already off, and pole 153' must switch contacts to remove power from load 150'. In order to decide which relays should toggle and which should not, the circuit accounts for the state of each load, using non-latching relays A and B as follows: First, considering load 150, relay A coil 168 is connected across power supply lines 159 and 163. Current flows through coil 168 when poles 153 and 155 are on opposite contacts (power off) and no current flows when the corresponding poles are on the same contact (power on). The impedance of coil 168 is preferably much greater than the impedance of load 150, so that essentially zero power is provided to load 150 when poles 153 and 155 are on opposite contacts (power off).

Since coil 168 and contacts 166 of relay A are electromechanically coupled, current flowing through relay A coil 168 switches relay A pole 167 to the normally open position. When current does not flow, pole 167 switches to the normally closed position. As shown, when power to load 150 is off, pole 167 is in the normally open position. If all-on momentary 158 is now actuated, a DC current flows through diode 171, contacts 166, and relay 1 coil 164, causing relay 1 contacts 152 to toggle. Power is then provided to load 150 and current through relay A coil 168 ceases, causing relay A pole 167 to switch to the normally closed position. With pole 167 in the normally closed position, actuating momentary contact 158 ("all-on") does not affect the flow of power to load 150; however, actuating momentary contact 160 ("all-off") removes power from load 150 by providing a current through relay 1 coil 164, which causes relay 1 pole 153 to toggle back to the position shown in FIG. 7. When that position is reached, current is passed through relay A coil 168, causing relay A pole 167 to switch back to the normally open position. At that point, with pole 167 in the normally open position, actuating momentary contact 160 has no effect on power to load 150, which remains off.

The operation of load 150' by momentary switches 158 and 160 is exactly analogous to that described above for load 150.

The sensing of load status, which is required for the operation of the "all on" and "all off" switches, does not necessarily require the relay scheme depicted in FIG. 7 and described above. Instead, load status sensing could be accomplished with an impedance device (such as a sensing resistor), a current transformer, a diode network, or an optically coupled device (such as a transistor, triac, or SCR) etc. An optically coupled transistor has the advantage that is also provides isolation between master control 155 and the corresponding loads. Load status can also be determined by detecting the presence of a conduction path from the voltage source to the load or by sensing the positions of relay poles 153 and 153', and of corresponding poles 155 and 155'. Alternatively, control could be either analog or digital, with a logic circuit used in place of relays A and B to energize relay coils 164 and 164'. Relay contacts 166 and 166' can alternatively be replaced with controllably conductive devices such as transistors or silicon controlled rectifiers.

Figure 8:
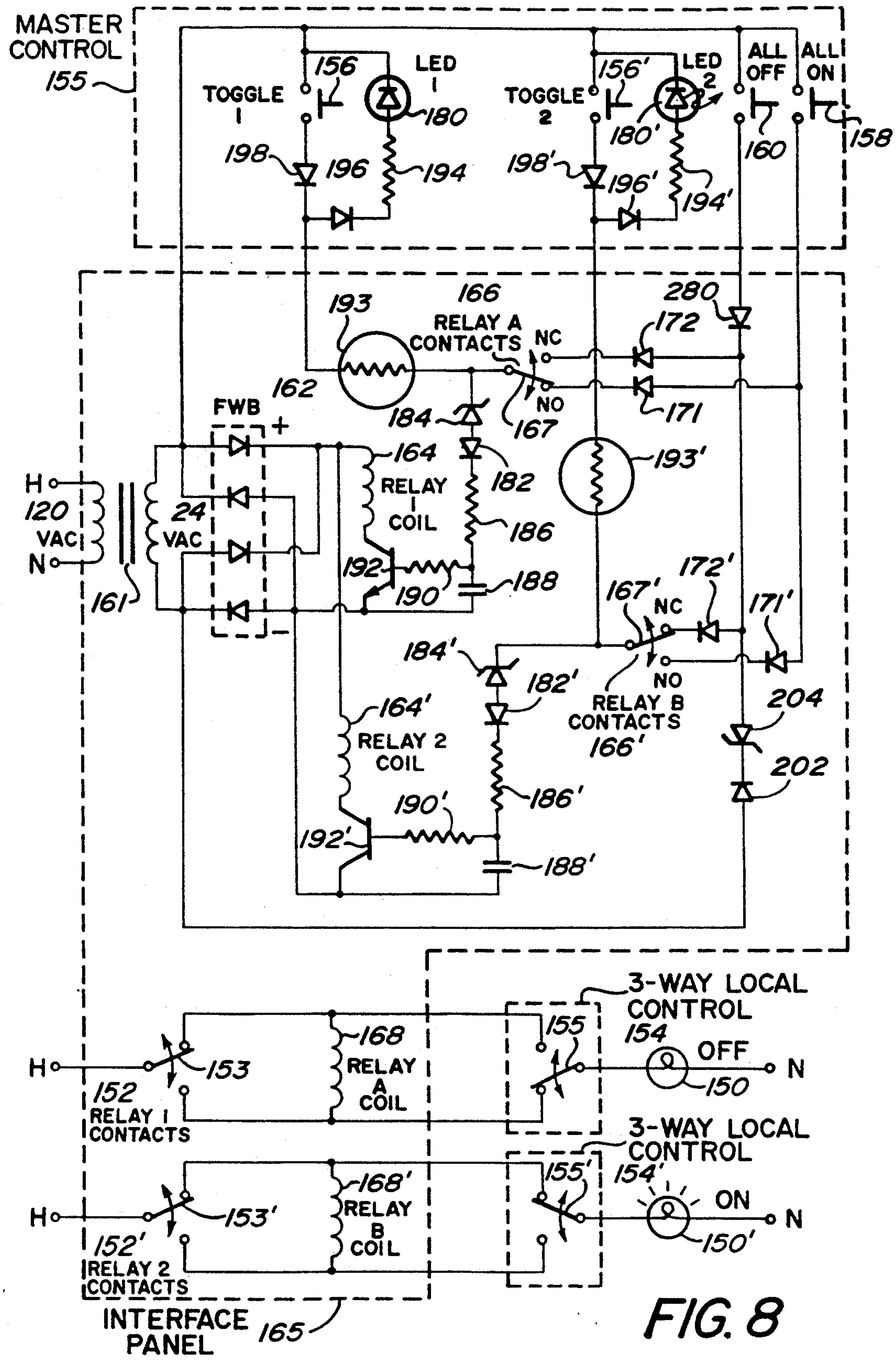
FIG. 8 is a schematic showing in more detail the master control system of FIG. 7.

FIG. 8 is an electrical schematic showing, in more detail, the master control system of FIG. 7. Power to loads 150 and 150' is controlled, respectively, by latching-toggle-relays 152 and 152', and by local three-way controls 154 and 154'. The circuit operates substantially like the circuit shown in FIG. 7 with the exception of the control circuitry in interface panel 165, and the added LED load status indicators 180 and 180'. Interface panel 165 is supplied by low voltage from transformer 161, which electrically isolates interface 165 and master control 155 from line voltage applied across loads 150 and 150'.

The control circuitry operates as follows: Actuating momentary contact 156 allows current to flow through diode 198, resistor 193, zener diode 184, diode 182, and resistor 186 to charge capacitor 188. Capacitor 188 discharges through resistor 190 into the base of transistor 192, turning it on. DC current flows from full-wave bridge 162 through relay 1 coil 164, toggling relay 1 pole 153 and providing power to load 150. In order to turn load 150 off again, momentary contact 156 is again actuated, charging capacitor 188 and turning on transistor 192. Current flows through relay 1 coil 164, switching pole 153 of relay 1 back to its original contact, thus blocking power to load 150 (as shown). Similarly, load 150' can be alternatively turned on or off by actuation of momentary contact 156'. Optional PTC resistors 193 and 193' limit the current through contacts 156, 166 and 156', 166' respectively, in case of an accidental miswire. As discussed above, AC current flows through relay coils 168 and 168' when the corresponding relay and switch poles are on opposite contacts (power off), and no current flows when the corresponding poles are on the same contacts (power on). As shown, when power to load 150 is off, poles 167 is in the normally open position. Similarly, when power to load 150' is on, pole 167' is in the normally closed position (as shown).

Actuating the all-on momentary contact 158 causes current to flow room transformer 161 through diode 171 and relay A contacts 166, charging capacitor 188 through resistor 186. Capacitor 188 discharges to the base of transistor 192, turning it on. Diode 182 keeps capacitor 188 from discharging through resistor 186 during the negative half cycle of power flow from transformer 161. DC current flows from full-wave bridge 162 through transistor 192 and relay 1 coil 164, which toggles relay 1, causing power to be applied to load 150. Since relay B pole 167' is in the normally closed position, capacitor 188' cannot charge up and transistor 192' remains off, preventing current from flowing through relay 2 coil 164'. Thus, load 150' remains on.

Actuating the all-off momentary contact 160 causes current to flow from transformer 161 through diode 172' and relay contacts 166', charging capacitor 188' through resistor 186'. Capacitor 188' discharges into the base of transistor 192', turning it on. Diode 182' keeps capacitor 188' from discharging back through resistor 186' during the negative half cycle of power flow from transformer 161. DC current flows from full-wave-bridge 162 through transistor 192' and relay 2 coil 164', which toggles relay 2, causing power to be removed from load 150'. Since relay A pole 167 is in the normally open position, capacitor 188 cannot charge up and transistor 192 remains off, preventing current from flowing through relay 1 coil 164. Thus, load 150 remains off.

As discussed above, relay poles 167 and 167' are in the normally closed position when power is being provided to load 150 and 150', respectively (because no current flows through the corresponding relay coils 168 and 168'). If desired, therefore, load status can be provided by an electrical signal that passes through contacts 166 and 166' (when they are in the normally closed position), providing power to LED 180 and 180', respectively. The LEDs are off when the corresponding loads are off. Alternatively, the LED may be dim to indicate that the corresponding load is off or the brightness of the LED may correspond to the level of power provided to the load. Resistors 194 and 194' limit the current through LEDs 180 and 180' respectively. Diodes 196 and 196' prevent reverse voltage from being applied across the LEDs, which could damage them. DC power to the LEDs is provided through transformer 161, diode 202, and Zener diode 204. Diode 202 and Zener diode 204 rectify and drop the transformer voltage for application across LEDs 180 and 180'. Zener diode 184 prevents current flowing through Zener diode 204 from flowing through the base of transistor 192. To accomplish this, the combined breakover voltages of Zener diodes 184 and 204 preferably exceed the maximum voltage provided by transformer 161. Similarly, Zener diode 184' prevents current flowing through Zener diode 204 from flowing through the base of transistor 192'.

With load 150' on, as shown, when toggle 156' is actuated, diode 198' prevents the LED current from flowing through the 156' contacts. Diode 198 similarly protects the toggle 156 contacts.

Since certain changes may be made in the above apparatus without departing from the scope of the invention herein involved, it is indeed that all matter combined in the above description or shown in the accompanying drawings shall be interpreted in an illustrative and not a limiting sense.

We claim:

1. A system to control electrical power from a source, through a plurality of power controls for controlling the level of power to be provided to corresponding loads, comprising, in combination:

(a) a plurality of electrically-operable toggle switch means for alternately connecting and disconnecting said source through said plurality of power controls to said corresponding loads;

(b) master control means connected to said source and providing a signal corresponding to the desired on/off state of the power to be provided to each of said loads;

(c) means connected to each of said loads for sensing the actual on/off state of the power provided to each of said loads;

(d) means for comparing said desired on/off state of power against said actual on/off state of power for each of said loads and for actuating each of said corresponding electrically operable toggle switch means only if said desired on/off state of power and said actual on/off state of power are not the same, whereby the on/off state of power to each of said loads is selectably controlled by means selected from the group comprising said master control means and each of said power controls.

2. The system of claim 1 wherein said master control means is adapted to substantially simultaneously turn on or off the power delivered to said loads.

3. The system of claim 1 wherein said master control means comprises means for indicating the power delivered to said loads.

4. The system of claim 3 wherein said power sensing means comprises an optically coupled device.

5. The system of claim 1 wherein said power sensing means comprises an optically coupled device.

6. The system of claim 1 wherein said power sensing means comprises a current transformer.

7. The system of claim 6 wherein said master control means comprises means for indicating the power delivered to said loads.

8. The system of claim 1 wherein said comparing means comprises a logic circuit.

9. The system of claim 1 wherein said master control means is adapted to independently control the power delivered to each of said loads.

10. The system of claim 9 wherein said master control means is adapted to substantially simultaneously turn on or off the power delivered to said loads.

11. The system of claim 10 wherein said master control means comprises means for indicating the power delivered to said loads.

12. A system to control electrical power from a source, through a plurality of power controls for controlling the level of power to be provided to corresponding loads, comprising, in combination:

(a) a plurality of electrically-operable toggle switch means for alternately connecting and disconnecting said source through said plurality of power controls to said corresponding loads, wherein said toggle switch means comprises a three-way relay;

(b) master control means connected to said source and providing a signal corresponding to the desired on/off state of the power to be provided to each of said loads;

(c) means connected to each of said loads for sensing the actual on/off state of the power provided to each of said loads;

(d) means for comparing said desired on/off state of power against said actual on/off state of power for each of said loads and for actuating each of said corresponding electrically operable toggle switch means only if said desired on/off state of power and said actual on/off state of power are not the same, whereby the on/off state of power to each of said loads is selectably controlled by means selected from the group comprising said master control means and each of said power controls.

13. A system to control electrical power from a source, through a plurality of power controls for controlling the level of power to be provided to corresponding loads each of which comprises a three-way dimmer, said system comprising, in combination:

(a) a plurality of electrically-operable toggle switch means for alternately connecting and disconnecting said source through said plurality of power controls to said corresponding loads;

(b) master control means connected to said source and providing a signal corresponding to the desired on/off state of the power to be provided to each of said loads;

(c) means connected to each of said loads for sensing the actual on/off state of the power provided to each of said loads;

(d) means for comparing said desired on/off state of power against said actual on/off state of power for each of said loads and for actuating each of said corresponding electrically operable toggle switch means only if said desired on/off state of power and said actual on/off state of power are not the same, whereby the on/off state of power to each of said loads is selectably controlled by means selected from the group comprising said master control means and each of said power controls.

14. The system of claim 12 wherein said power sensing means comprises an optically coupled device.

15. A system to control electrical power from a source, through a plurality of power controls for controlling the level of power to be provided to corresponding loads, comprising, in combination:

(a) a plurality of electrically-operable toggle switch means for alternatively connecting and disconnecting said source through said plurality of power controls to said corresponding loads;

(b) master control means connected to said source and providing a signal corresponding to the desired on/off state of the power to be provided to each of said loads, said master control means being adapted to substantially simultaneously turn on or off the power delivered to said loads;

(c) means connected to each of said loads for sensing the actual on/off state of the power provided to each of said loads, said power sensing means comprising a relay coil;

(d) means for comparing said desired on/off state of power against said actual on/off state of power for each of said loads and for actuating each of said corresponding electrically operable toggle switch means only if said desired on/off state of power and said actual on/off state of power are not the same, whereby the on/off state of power to each of said loads is selectably controlled by means selected from the group comprising said master control means and each of said power controls.

16. A system to control electrical power from a source, through a plurality of power controls for controlling the level of power to be provided to corresponding loads, comprising, in combination, (a) a plurality of electrically-operable toggle switch means for alternately connecting and disconnecting said source through said plurality of power controls to said corresponding loads;

(b) a first master control means connected to said source and providing a signal corresponding to the desired on/off state of the power to be provided to each of said loads;

(c) a second master control means for controlling power to said loads, said second master control means connected to said source and providing a signal corresponding to the desired on/off state of the power to be provided to each of said loads;

(d) means connected to each of said loads for sensing the actual on/off state of the power provided to each of said loads; and (e) means for comparing said desired on/off state of power from each of said first and second master control means against said actual on/off state of power for each of said loads and for actuating each of said corresponding electrically operable toggle switch means only if said desired on/off state of power from either of said first and second master control means and said actual on/off state of power are not the same, whereby the on/off state of power to each of said loads is selectably controlled by means selected from the group comprising said first and second master control means and each of said power controls.

17. The system of claim 16 wherein said master control means is adapted to substantially simultaneously turn on or off the power delivered to said loads.

18. A system to control electrical power from a source, through a plurality of power controls for controlling the level of power to be provided to corresponding loads, comprising, in combination:

(a) a plurality of electrically-operable toggle switch means for alternately connecting and disconnecting said source through said plurality of power controls to said corresponding loads;

(b) master control means connected to said source and providing a signal corresponding to the desired on/off state of the power to be provided to each of said loads, said signal corresponding to the desired on/off state of the power being in the form of a momentary switch closure;

(c) means connected to each of said loads for sensing the actual on/off state of the power provided to each of said loads;

(d) means for comparing said desired on/off state of power against said actual power for each of said loads and for actuating each of said corresponding electrically operable toggle switch means only if said desired on/off state of power and said actual on/off state of power are not the same, whereby the on/off state of power to each of said loads is selectably controlled by means selected from the group comprising said master control means and each of said power controls.

19. A system to control electrical power from a source, through a plurality of power controls for controlling the level of power to be provided to corresponding loads, comprising, in combination:

(a) a plurality of electrically-operable toggle switch means for alternatively connecting and disconnecting said source through said plurality of power controls to said corresponding loads;

(b) master control means connected to said source and providing a signal corresponding to the desired on/off state of the power to be provided to each of said loads;

(c) means connected to each of said loads for sensing the actual on/off state of the power provided to each of said loads, said power sensing means comprising a relay coil;

(d) means for comparing said desired on/off state of power against said actual on/off state of power for each of said loads and for actuating each of said corresponding electrically operable toggle switch means only if said desired on/off state of power and said actual on/off state of power are not the same, whereby the on/off state of power to each of said loads is selectably controlled by means selected from the group comprising said master control means and each of said power controls.

20. A system to control electrical power from a source, through a plurality of power controls for controlling the level of power to be provided to corresponding loads, comprising, in combination:

(a) a plurality of electrically-operable toggle switch means for alternately connecting and disconnecting said source through said plurality of power controls to said corresponding loads;

(b) a first master control means connected to said source and providing a signal corresponding to the desired on/off state of the power to be provided to each of said loads;

(c) a second master control means for controlling power to said loads; said second master control means connected to said source and providing a signal corresponding to the desired on/off state of the power to be provided to each of said loads;

(d) means connected to each of said loads for sensing the actual power provided to each of said loads;

(e) means for comparing said desired on/off state of power from each of said first and second master control means against said actual on/off state of power for each of said loads, said comparing means comprising a logic circuit for actuating each of said corresponding electrically operable toggle switch means only if said desired on/off state of power from either of said first and second master control means and said actual on/off state of power are not the same, whereby the on/off state of power to each of said loads is selectably controlled by means selected from the group comprising said first and second master control means and each of said power controls.

21. A system to control electrical power from a source, through a plurality of power controls for controlling the level of power to be provided to corresponding loads, comprising, in combination:

(a) a plurality of electrically-operable toggle switch means for alternately connecting and disconnecting said source through said plurality of power controls to said corresponding loads;

(b) master control means connected to said source and providing a signal corresponding to the desired on/off state of the power to be provided to each of said loads;

(c) means connected to each of said loads for sensing the actual power provided to each of said loads;

(d) means for comparing said desired on/off state of power against said actual on/off state of power for each of said loads, said comparing means comprising a non-latching three-way relay and actuating each of said corresponding electrically operable toggle switch means only if said desired on/off state of power and said actual on/off state of power are not the same, whereby the on/off state of power to each of said loads is selectably controlled by means selected from the group comprising said master control means and each of said power controls.

22. The system of claim 21 wherein said master control means is adapted to substantially simultaneously turn on or off the power delivered to said loads.

23. A system to control electrical power from a source, through a plurality of power controls for controlling the level of power to be provided to corresponding loads, comprising, in combination:

(a) a plurality of electrically-operable toggle switch means for alternately connecting and disconnecting said source through said plurality of power controls to said corresponding loads;

(b) master control means connected to said source and providing a signal corresponding to the desired on/off state of the power to be provided to each of said loads, said master control means being adapted to substantially simultaneously turn on or off the power delivered to said loads;

(c) means connected to each of said loads for sensing the actual power provided to each of said loads, said power sensing means comprising a relay coil;

(d) means for comparing said desired on/off state of power against said actual on/off state of power for each of said loads, said comparing means comprising a non-latching three-way relay and actuating each of said corresponding electrically operable toggle switch means only if said desired on/off state of power and said actual on/off state of power are not the same, whereby the on/off state of power to each of said loads is selectably controlled by means selected from the group comprising said master control means and each of said power controls.

* * * * *